(No Model.)

A. C. FERRELL & T. J. HAMRICK.
BRACE FOR HEEL SWEEPS.

No. 552,829. Patented Jan. 7, 1896.

WITNESSES:
Chas. Nida.
Fred Acker

INVENTORS:
A. C. Ferrell
T. J. Hamrick
BY Munn & Co.
ATTORNEYS.

UNITED STATES PATENT OFFICE.

AUGUSTUS C. FERRELL AND THOMAS J. HAMRICK, OF CARROLL, ASSIGNORS OF ONE-THIRD TO SPARKS P. VEASEY, OF GARDEN VALLEY, TEXAS.

BRACE FOR HEEL-SWEEPS.

SPECIFICATION forming part of Letters Patent No. 552,829, dated January 7, 1896.

Application filed December 11, 1894. Serial No. 531,484. (No model.)

*To all whom it may concern:*

Be it known that we, AUGUSTUS C. FERRELL and THOMAS J. HAMRICK, of Carroll, in the county of Smith and State of Texas, have invented a new and Improved Brace for Heel-Sweeps, of which the following is a full, clear, and exact description.

Our invention relates to an improvement in agricultural implements; and it has for its object to provide a brace for heel-sweeps which will be exceedingly simple, durable, and economic, and by means of which the wings of the sweep will be prevented from closing, and whereby that portion of the sweep through which the heel-bolt passes will be materially strengthened.

It is further an object to provide a brace which may be applied to sweeps of any size; and this is attended by a peculiar construction which results in the complete adjustability of the parts.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
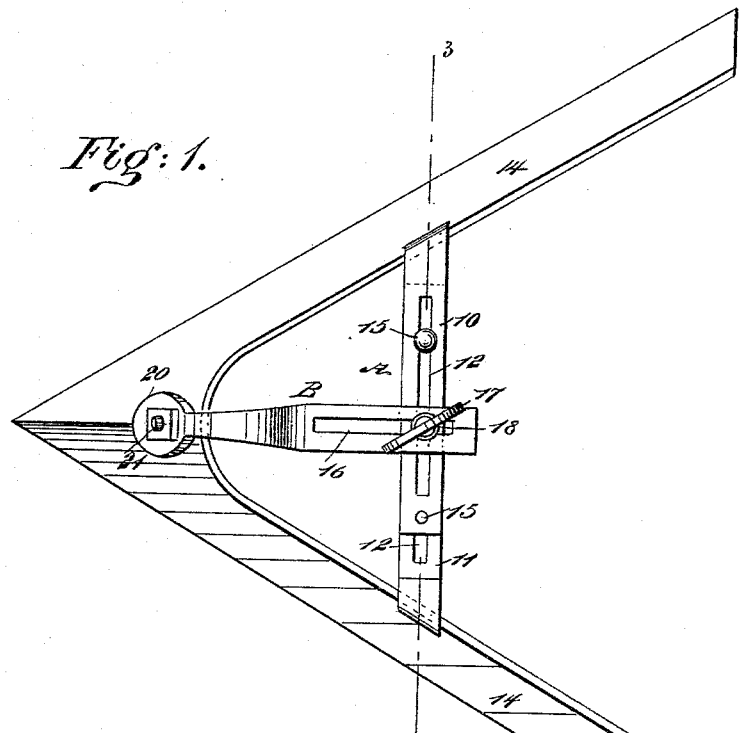
Figure 2:
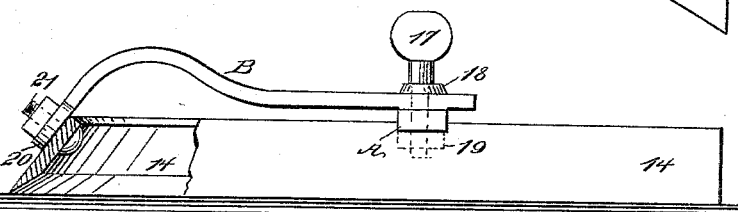
Figure 3:
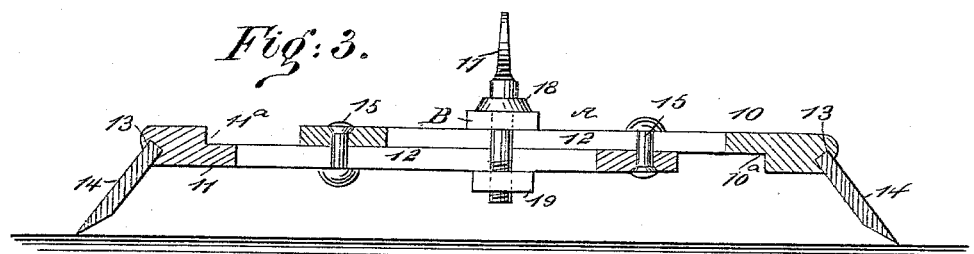

Figure 1 is a plan view of the improved heel-sweep brace. Fig. 2 is a side elevation, a portion of the front being broken away; and Fig. 3 is a transverse section taken substantially on the line 3 3 of Fig. 1.

In carrying out the invention the cross-bar A of the sweep is the adjusting or fixing medium, and consists of two members 10 and 11, each member being a bar, and each bar is held to slide upon the other. The bar 11 is provided with a longitudinal recess 11$^a$ in its upper face, while the bar 10 is provided with a corresponding recess 10$^a$ in its under face, the recesses extending from a point near the outer ends of the members to their very inner ends. Each member 10 and 11 of the cross-bar is provided with a longitudinal slot 12, and the outer extremity of each member is biased, the direction being from the rear inwardly toward the front. In the biased end of each member of the cross-bar a transverse and diagonal channel 13 is formed, and this channel is provided with a downwardly-inclined bottom wall and an overhanging or substantially downwardly-inclined upper wall. These channels are adapted to receive the wings 14 of the sweep, which are of the ordinary construction, and the wings are so braced that they will be prevented from springing either inward or outward. The two members 10 and 11 of the said cross-bar are guided in their movement one upon the other by means of pins 15, which are secured in the solid portion of one bar and extend through the slot of the opposing bar, as shown in Fig. 3. A connecting or tie bar B is employed to connect the heel-bolt 21 at the forward portion of the sweep with the cross-bar A, and this tie-bar is provided with a straight rear portion having a slot 16 made longitudinally therein, and the straight portion of the tie-bar is adjustably secured to the cross-bar, preferably by means of a thumb-bolt 17, which is passed through the slot 16 and through the aligned slots 12 in the cross-bar, the said thumb-bolt being provided with a washer 18, resting, for example, on the inner or rear end of the tie-bar, and a nut 19, which will have a bearing against the under member of the cross-bar. The forward end of the tie-bar is arched and is made to terminate in a downwardly-inclined eye 20, as shown in Figs. 1 and 2. This eye is brought to a bearing against the front part of the sweep and the heel-bolt 21 is passed through this eye and through suitable apertures in the wing.

It will thus be seen that by means of the completely adjustable character of the three bars comprising the brace the device may be applied to all kinds and sizes of sweeps and arranged with the same as may be most advantageous.

Having thus fully described our invention, we claim as new and desire to secure by Letters Patent—

1. A brace for heel sweeps, consisting of two transverse brace bars each having a diagonal slot receiving the upper edges of the sweep, the inner portions of the bars being reduced in thickness and each having a shoulder near its outer end, the reduced parts being slotted and each bar having at its extremity a stud extending perpendicularly thereto and slidable in the respective slots, a longitudinal brace bar connected to the front of the heel sweep and extending rearwardly and having a slot at its rear portion, and a binding screw passed through the slots of the transverse and longitudinal brace bars, substantially as described.

2. A brace for heel sweeps, the same consisting of two transverse braces adjustable longitudinally on each other, and a longitudinal brace formed with a longitudinally extending slot, the transverse braces being adjustable longitudinally on the longitudinal brace, substantially as described.

AUGUSTUS C. FERRELL.
THOMAS J. HAMRICK.

Witnesses:
G. W. MATTHEWS,
HENRY MONTGOMERY.